(12) United States Patent
Chuang et al.

(10) Patent No.: US 8,645,261 B2
(45) Date of Patent: Feb. 4, 2014

(54) SYSTEM AND METHOD FOR PROVIDING A MARKET-BACKED ANNUITY WITH VARIABLE SEGMENT TERMS AND AUTOMATIC ROLLOVER

(75) Inventors: Chad Chuang, Forest Hills, NY (US); Adam Stolz, Paris (FR)

(73) Assignee: Axa Equitable Life Insurance Company, New York, NY (US)

(*) Notice: Subject to any disclaimer, the term of this patent is extended or adjusted under 35 U.S.C. 154(b) by 0 days.

(21) Appl. No.: 13/238,795

(22) Filed: Sep. 21, 2011

(65) Prior Publication Data

US 2013/0013531 A1    Jan. 10, 2013

Related U.S. Application Data

(60) Provisional application No. 61/384,916, filed on Sep. 21, 2010.

(51) Int. Cl.
*G06Q 40/00* (2012.01)

(52) U.S. Cl.
USPC .............................. 705/37; 705/35; 705/36 R (58) Field of Classification Search
USPC ...................... 705/37, 36 R, 35, 40
See application file for complete search history.

(56) References Cited

U.S. PATENT DOCUMENTS

2009/0307147 A1* 12/2009 Ruggie ..................... 705/36 R
2010/0228686 A1*  9/2010 Zayed ........................ 705/36 T
2011/0320346 A1* 12/2011 Reichman et al. ............. 705/39

* cited by examiner

*Primary Examiner* — James A Vezeris
(74) *Attorney, Agent, or Firm* — Antonio Papageorgiou; Ostrow Kaufman LLP (57) ABSTRACT

The present invention provides a method and system for providing a market-backed annuity allowing for client-selected segment terms and automatic rollover. The method and system includes techniques for allowing an investor to specify a segment maturity date, specify a percentage of upside and downside protection, specify an underlying market index, and choose an amount of investment capital. By providing flexibility, the current invention increases the security and performance of market-backed annuity products.

20 Claims, 9 Drawing Sheets

| Protected Investment Option: 15 Segment Types | | | | | |
|---|---|---|---|---|---|
| Index | Buffer | 1-year | 3-year | 5-year | Full Index Name |
| S&P | -10% | 1 | 2 | 3 | S&P 500 Price Index |
| S&P | -20% |  | 4 | 5 | S&P 500 Price Index |
| S&P | -30% |  |  | 6 | S&P 500 Price Index |
| Russell | -10% | 7 | 8 | 9 | Russell 2000 Price Index |
| Russell | -20% |  | 10 | 11 | Russell 2000 Price Index |
| Russell | -30% |  |  | 12 | Russell 2000 Price Index |
| EAFE | -10% | 13 |  |  | MSCI EAFE Price Index |
| Gold* | -10% | 14 |  |  | COMEX Gold 100oz Futures Front month |
| Oil* | -10% | 15 |  |  | NYMEX West Texas Intermediate Crude Oil Futures Front Month |

(*) Gold & Oil available for IRA only

SYSTEM AND METHOD FOR PROVIDING A MARKET-BACKED ANNUITY WITH VARIABLE SEGMENT TERMS AND AUTOMATIC ROLLOVER

CROSS REFERENCE TO RELATED APPLICATIONS

This application claims the benefit of U.S. Provisional Application Ser. No. 61/384,916, filed Sep. 21, 2010, which is hereby incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to providing a market-backed (or "index-linked") annuity allowing for client-selected segment terms and automatic rollover. More specifically, embodiments of the present invention are directed towards systems and methods for receiving and investing client funds in a market-backed annuity and allowing for variable segment lengths and a client-determined rollover option.

BACKGROUND OF THE INVENTION

Variable annuities allow investors to engage in tax-deferred investing such as for retirement in amounts greater than permitted by individual retirement or 401(k) plans. In addition, many variable annuity contracts offer a guaranteed minimum rate of return (either for a future withdrawal and/or in the case of the owner's death), even if underlying separate account investments perform poorly. This can be attractive to people uncomfortable investing in the equity markets that do not guarantee a rate of return.

With a guaranteed rate of return, variable annuities as well as fixed annuities are generally limited in their potential for growth. To maximize growth, some annuities invest funds directly in the stock market through the purchase of mutual funds. The inherent risk with this type of direct investment in the market threatens the stability of fixed and variable annuities without necessarily leading to additional gains. An alternative is an equity indexed annuity which invests in a derivative instrument, the equity index. Typical equity indexed annuities still offer a minimum rate of return while allowing the annuitant to participate in the market by crediting the annuity based on a formula that is linked to the performance of the equity index. Unfortunately, the interest rate realized by the current set of equity indexed annuities does not match the performance of the equity index the annuity invests in. Instead, the rate of return is only a percentage of the performance and will depend on a number of variables including, inter alia, the participation rate, choice of index, administrative costs and management fees.

As such, there is a need to provide investors with a financial vehicle for a tax-deferred growth strategy which includes a built-in protection feature providing investors the opportunity to invest for growth with some downside protection. There is also a need for a product which offers participation in the performance of the equity or commodity index with a performance cap and a downside buffer.

SUMMARY OF THE INVENTION

The present invention is directed towards systems and methods for providing an index-backed annuity. In one embodiment, a method electronically receives an investor request for an index-backed annuity and plurality of funds to be invested in the index-backed annuity. In one embodiment, calculating an index performance rate based on how the index performed. In another embodiment, the maturity value corresponds to the performance of the underlying index and may be adjusted based on a performance cap rate and a segment buffer rate. In another embodiment, the investor requests a selection of an index to back the annuity.

The method further electronically determines a segment maturity date, underlying asset, and performance cap and segment buffer rates. In one embodiment, the performance cap rate is the maximum guaranteed investment. In another embodiment, the segment buffer rate is the minimum guaranteed investment. The method further electronically places the received plurality of funds in a segment account and simulates up-turns and down-turns in the underlying asset via call and put options. The method further in response to a withdrawal request, electronically performs a liquidity calculation to calculate the withdrawal value. The method further electronically rolls over the index-backed annuity upon the segment maturity date in accordance with the preference of the investor.

The present invention is further directed towards providing an index-back annuity. In one embodiment, a method electronically receives an investor request for an index-backed annuity and a plurality of funds to be invested in the index-backed annuity. The method further electronic selects at least one investment segment and an opt-out threshold, for each investment segment a segment term is selected. The method further electronically places the received plurality of funds in a holding account. The method further upon determining that funds have a segment start date, electronically determines a performance cap rate and a segment buffer rate and places the plurality of funds in a segment account. The method further upon determining that a segment is mature, electronically calculates a maturity value. The method further in response to a rollover request, electronically determines whether the annuity should be rolled over based on an investor's annuity contract. The method further upon determining that the annuity should be rolled over, electronically transfers funds into a new segment term. In one embodiment, the method further comprises upon determining that the annuity should not be rolled over, electronically distributes the annuity based on the investor's contract. In another embodiment, the segment term is 1, 3, or 5 years.

The present invention is further directed towards a system for providing a market-backed annuity. The system comprises a protection calculator operative to calculate a performance cap rate and a segment buffer rate associated with an indexed fund. The system further comprises a processor operative to handle request from a plurality of client devices communicatively coupled to a network interface. The processor may be further operative to transmit a request to the protection calculator to calculate the performance cap rate or the segment buffer rate.

The processor may be further operative to utilize an investor data store to initiate and complete transactions between a plurality of accounts. In an alternative embodiment, the plurality of accounts further comprises a holding account and a segment account. In an alternative embodiment, the investor data store further comprises a plurality of data bases including investor data. In another embodiment, the investor data store further comprises storing metrics associated with a given index-backed annuity. In another embodiment, the stored metrics in the investor data store include segment terms and rollover options.

The processor further operative to transfer funds to the plurality of accounts. The processor further operative to analyze the plurality of accounts through a plurality of market participants communicatively coupled to the network interface.

The present invention provides a tax-deferred variable annuity offering a variety of indexed options and commodities, in various durations. The investors have choices of various segments that invest with multiple indices including gold and oil. The present invention features a structured investment option and a variable investment option, designed to provide a greater degree of control while managing both risk and return.

The present invention provides various segment types. Each segment type offers a specific duration of 1, 3 or 5 years known as segment maturity. The segment type also includes a segment buffer, which is the downside protection against loss, and a performance cap rate ticker which is the maximum upside allowed in a given segment maturity. This is a cap on the segment growth as determined by the annuity provider based, in part, on the volatility of the equity index or commodity being tracked. The present invention employs call and put options to provide the upside potential and downside protection commonly used to hedge investment portfolios. The fees of the investment are built into the segment buffer and performance cap. All the segment types in the structured investment option are subject to a cap on gains. Any gains earned on the investment are tax-deferred as long as the investment is held in the contract.

Investors can select from a range of 1-3 years and upon maturity they can roll into the next duration and reallocate based on their investment objective. The segments are linked to the performance of a particular market index, such as the S&P 500 index and commodity index. The investment is designed to provide return similar to that of the index, and some investments may use leverage to pay investors as much as 150% of the return of their benchmark index. The investors forgo any dividend or interest income from the index.

The performance cap rate ticker eliminates the need to determine the structured investment option performance cap prior to segment start date. The investors and advisors can monitor the daily performance cap online with historical indicative caps for the previous five days. The actual declared and historical monthly performance cap rates are also displayed on the website for historical analysis. With this feature, advisors and clients can monitor and determine if they would like to set a performance cap threshold.

The segment buffer provides partial principal protection and these buffers typically range from 10% to 30%. For example, a segment with 10% buffer will return the investor's entire principal if the index has declined by 10% or less at the segment maturity. However, if the index losses exceed 10%, the insurer will cover the initial 10% and client will only lose principal for losses greater than 10%.

The present invention provides investors with control through the following: 1) maturity duration (1, 3, and 5 years), 2) various investment indices, 3) percentage of downside protection and upside maximum return, and 4) amounts allocated to each of the maturity segments.

The present invention allows the investor to protect equity assets while maintaining target levels of return over the long run. It provides the opportunity to participate in the upside performance potential of the selected index or commodity based investment options up to a performance cap rate, while minimizing or eliminating the downside with segment buffers. The present invention provides investment alternatives without a segment buffer and performance cap. Three investment options in some embodiments are: Equity Index 500 fund and Core Bond Index Fund, and Money Market.

Offering of segment types may be suspended with advance notice if market conditions are preventative of offering these types of services. The suspension may be month-to-month or indefinite. A month-to-month suspension may happen at any time up to the point the cap is declared for a segment start date. If offerings of new segment are suspended for a segment type, all money in the holding account for that segment type will remain in the holding account until the next eligible segment, if offered, or until the owner transfers the funds out of the holding account. The investor may receive a notification each month that the offering of a new segment remains suspended.

An indefinite suspension is an intent to terminate the segment type. The process to remove the terminated segment type may begin with a four month lead time during which money in the holding account will be defaulted to a money market variable investment option on the date that would have been the segment start date. An investment in a money market variable investment option may not be insured or guaranteed by the FDIC or any other government agency. Although the money market variable investment option may seek to preserve the value of an investment at $1.00 per unit, it is possible to lose money by investing in this portfolio. During the indefinite suspension period measures may be taken to prevent the money from being allocated or transferred into the terminated segment type. The investor may transfer the money out of the holding account into the holding account of another segment type. A notification may be generated for the default action and any interim transfers into and out of the terminated segment type indicating that the segment type has been terminated.

If money is received for a suspended or terminated segment type, the investor may be provided with the option to "free look" the segment. The free look is a period of time, usually ten days but may be longer or shorter, during which the client may terminate his or her contract without paying any surrender chargers and receive a refund for the contract.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
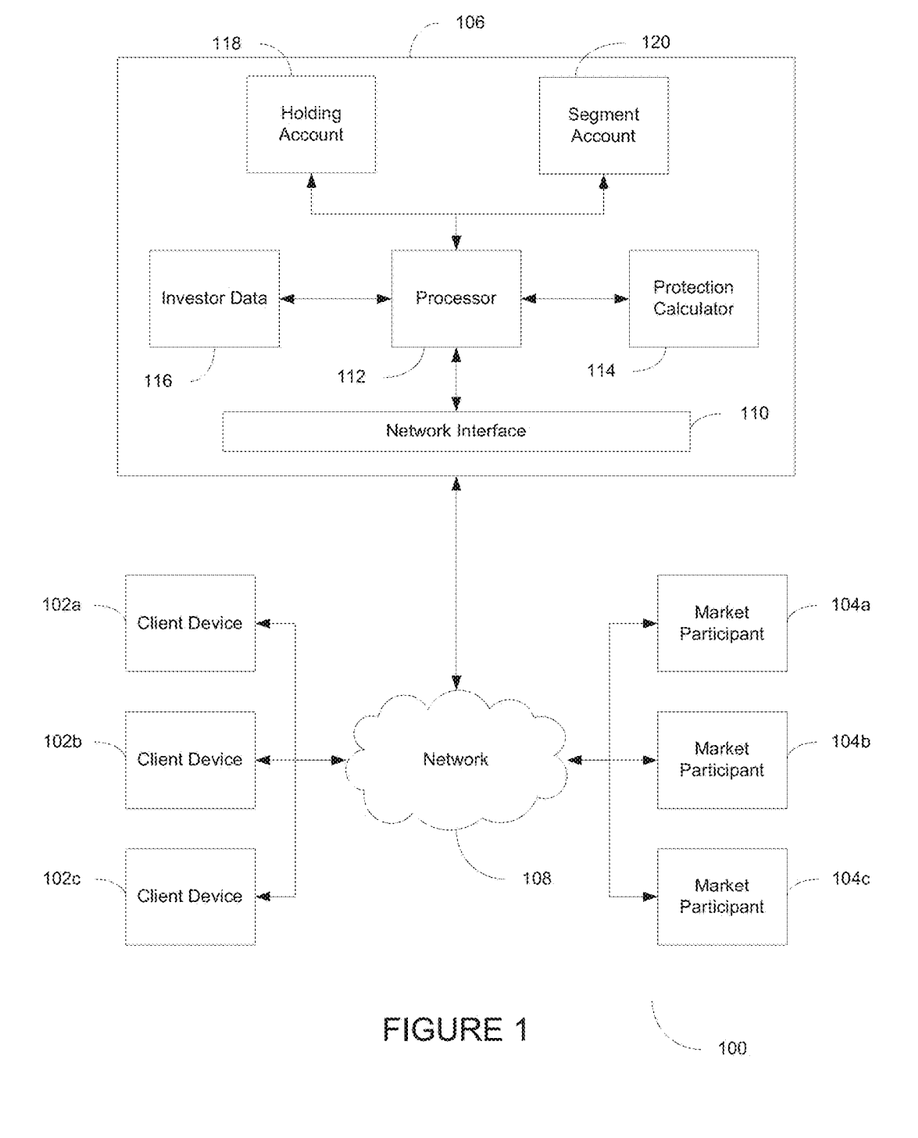
FIG. 1 presents a system for providing a market-backed annuity with variable segment terms and a rollover option according to one embodiment of the present invention.

FIG. 1 presents a system for providing a market-backed annuity with variable segment terms and a rollover option according to one embodiment of the present invention. As the embodiment of FIG. 1 illustrates, a plurality of client devices 102a, 102b, 102c and market participants 104a, 104b, 104c are connected to an annuity provider 106 via a network 108. Annuity provider 106 comprises a network interface 110, processor 112, protection calculator 114, investor data store 116, and a plurality of accounts 118-120 including a holding account 118 and a segment account 120.

As illustrated, a client device 102a, 102b, 102c comprises a general purpose computing device such as a personal computer or portable computing device, the computer or device having a processor, memory, and input/output devices. In one embodiment, a participant in an annuity provided by annuity provider 106 operates a client device 102a, 102b, 102c. In this embodiment, a participant may be able to, inter alia, inspect, modify, or remove funds invested in annuity provider 106. In an alternative embodiment, an employee of annuity provider 106 or other authorized user operates client device 102a, 102b, 102c. In this embodiment, an employee or authorized user may be able to, inter alia, transfer funds, modify system configurations, or perform various other administrative tasks.

Client devices 102a, 102b, 102c communicate with the annuity provider 106 through a network interface 110 provided by annuity provider 106. Such an interface may comprise various hardware and software components know in the art of computer networking. Processor 112 may be operative to handle incoming requests from client devices 102a, 102b, 102c. Although illustrated as a single device, processor 112 may comprise a plurality of hardware and software components communicating with each other to perform various computational processes.

Processor 112 is further coupled to a protection calculator 114. In the illustrated embodiment, processor 112 transmits a request for a performance cap and/or segment buffer to protection calculator 114. As previously discussed, a performance cap or segment buffer comprises a ceiling and floor, respectively, associated with an indexed fund such as the S&P 500. In alternative embodiments, the indexed fund may be linked to other indexes or commodities (such as oil or gold) including the Russell 2000 Price Return Index, MSCI EAFE Price Return Index, London Gold Market Fixing Ltd PM Fix Price/USD, or the NYMEX West Texas Intermediate Crude Oil Generic Front-Month Futures Index. Additionally, the particular index backing the annuity may be chosen by the client.

Figure 2:
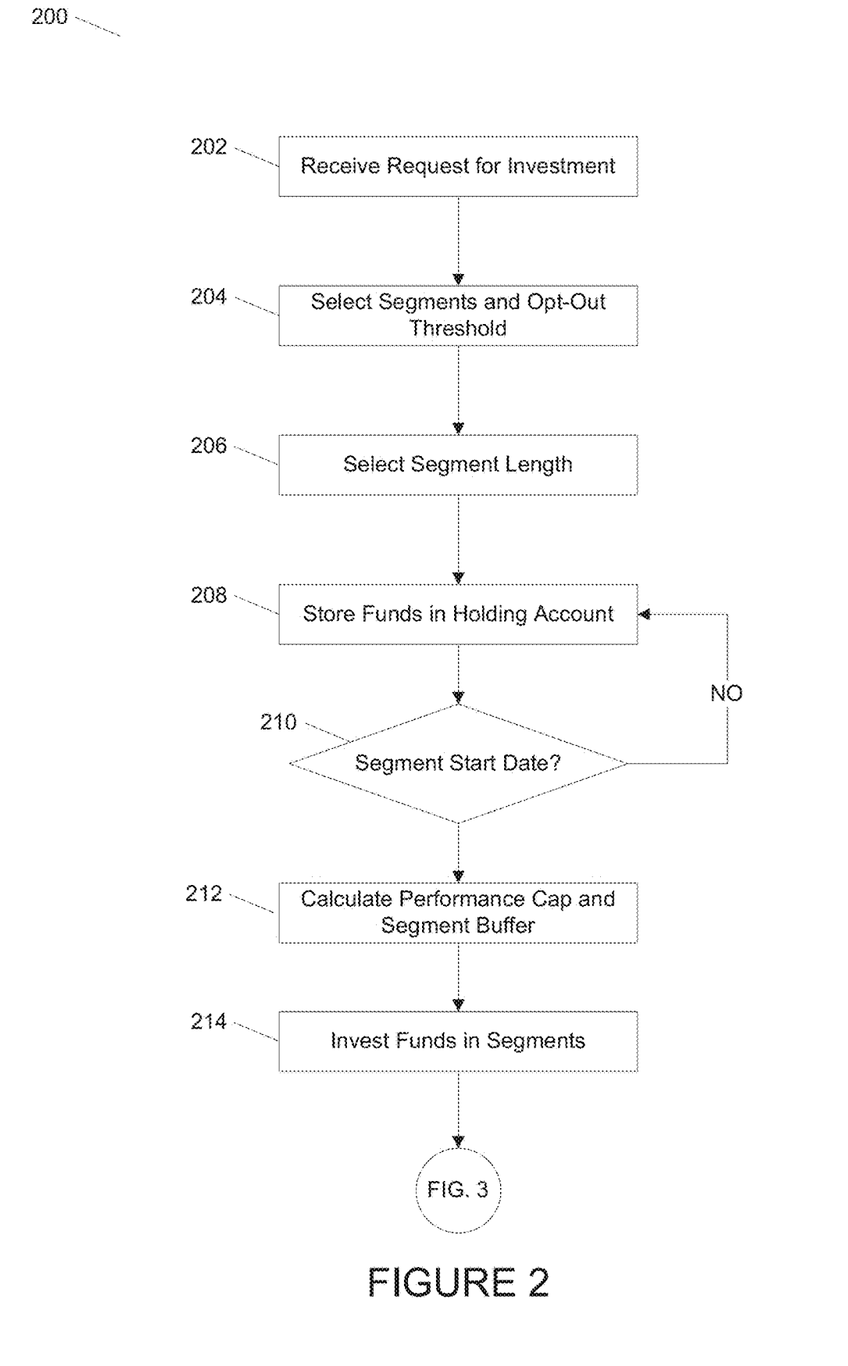
FIG. 2 presents a flow diagram illustrating a method for receiving and investing client funds in a market-backed annuity according to one embodiment of the present invention.
Figure 3:
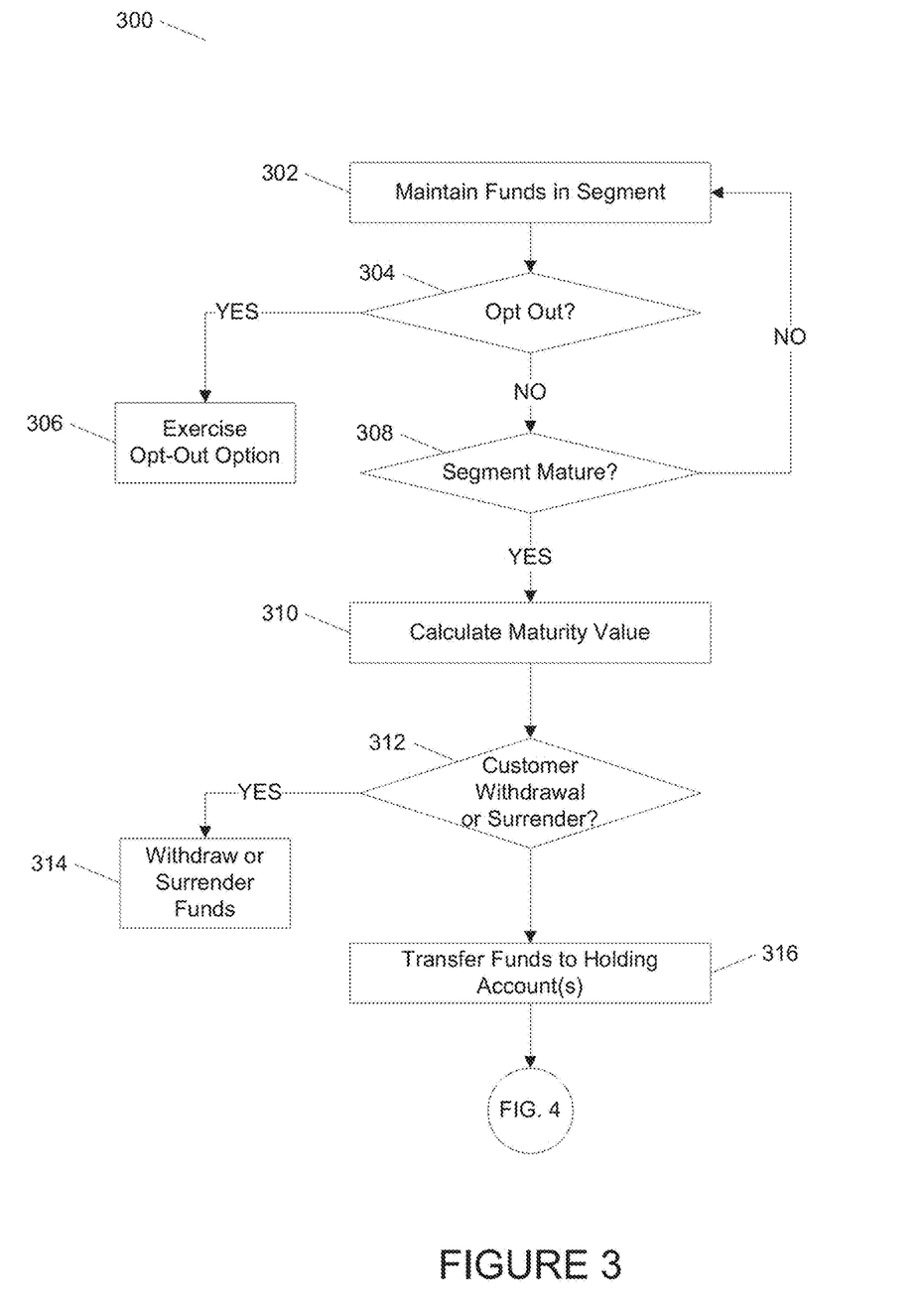
FIG. 3 presents a flow diagram illustrating a method for providing and maintaining a market-backed annuity according to one embodiment of the present invention.
Figure 4:
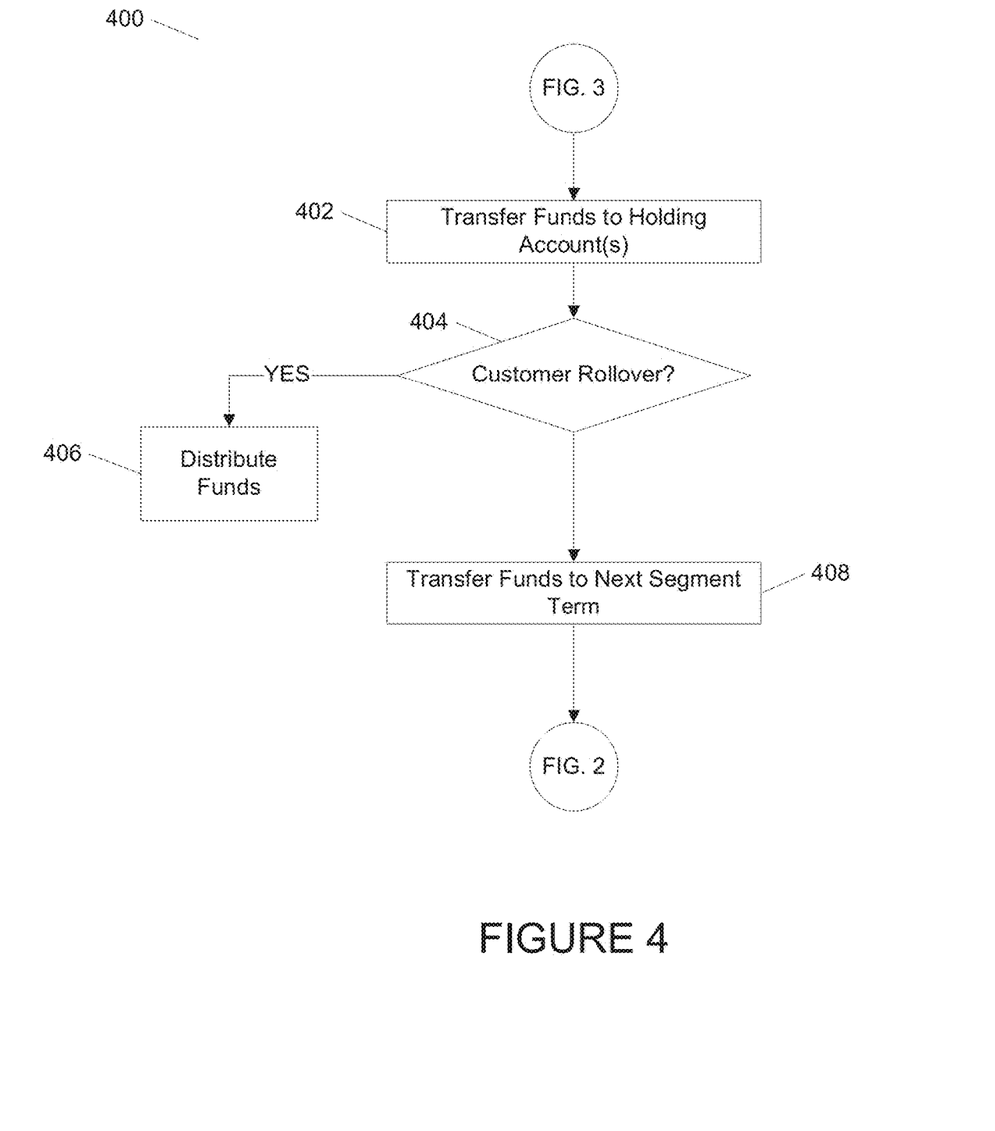
FIG. 4 presents a flow diagram illustrating a method for ending a market-backed annuity, and providing and managing a rollover option according to one embodiment of the present invention.

Particular calculations performed by the protection calculator 114 are further discussed with respect to FIGS. 2-4 and are not repeated here for clarity's sake. In one embodiment, processor 112 transmits a request for a performance cap and/or segment buffer at the beginning of a predefined segment term. In alternative embodiments, processor 112 may transmit a request for a performance cap and/or segment buffer on a rolling basis through a segment term.

Processor 112 is additionally coupled to an investor data store 116. In the illustrated embodiment, investor data store 116 comprises a plurality of databases containing investor data, that is, data related to customers of the annuity provider 106. For example, investor data store 116 may comprise records of customer account data including linking data associating a particular investor to a plurality of accounts, including those held in accounts 118-120. Processor 112 may utilize investor data store 116 to initiate and complete transactions between the accounts 118-120, as well as initiate transactions with market participants 104a, 104b, 104c. Data store 116 is further operative to store various metrics associated with a given index-backed annuity such as segment terms and rollover options, as will be discussed further herein.

In addition to the foregoing, processor 112 is operative to process a request for opting into a index-based annuity. In response to such a request, processor 112 transfers a plurality of investor funds into a holding account 118. In the illustrated embodiment, holding account 118 represents a temporary account utilized to pool investor funds until processor 112 determines that a segment start date has occurred. In one embodiment, the holding account 118 may comprise a preexisting account type (not shown) such as a money market investment account used for other annuities provided by annuity provider 106.

When a segment start date occurs, processor 112 transfers the funds into the segment account 120. While funds are in the segment account 120, processor 112 may dynamically determine an index-linked credit rating associated with the segment account 120. In the illustrated embodiment, processor 112 is operative to initially purchase a financial instrument, such as a bond, using the funds in the segment account. During the segment term, processor 112 analyzes the indexed account through market participants 104a, 104b, 104c and places out-of-money put options to replicate a downturn in the indexed fund. Additionally, processor 112 may place at-the-money calls and out-of-money calls to replicate an upturn in the indexed fund. Appendix E describes more fully a system and method for placing call and put options in order to replicate upturn and downturns in an index-based segment.

Such processing occurs throughout the segment term until segment maturity. When the segment term ends, annuity provider 106 may provide the investor a choice for transferring funds between accounts. In one embodiment, the annuity provider 106 may automatically re-invest the funds in the segment account 124 in the manner described above.

FIG. 2 presents a flow diagram illustrating a method for receiving and investing client funds in a market-backed annuity according to one embodiment of the present invention. As the embodiment of FIG. 2 illustrates, a method 200 receives a request for an investment, step 202. In one embodiment, a request for an investment corresponds to a client interacting with an annuity provider via a networked device or in person at a representative location of the annuity provider.

The method then selects one or more investment segments and an opt-out threshold, step 204. In the illustrated embodiment, an investor may choose a plurality of pre-determined segments. For example, an annuity provider may provide the investor with a plurality of investment choices, wherein the investor may select one or more of the available choices. In one embodiment, the list of indexes includes commodity based indexes. The method further determines a segment term, step 206. In one embodiment, the investor determines the segment term. For example, an investor may choose between 1, 3, or 5 year segment maturity terms.

The method 200 then places funds in a holding account, step 208. In one embodiment, placing funds in a holding account includes placing a portion of a regular index-backed annuity which holds amounts allocated to the index-backed annuity until transfer to a new segment on the segment start date. The method 200 then determines if a segment start date occurs, step 210. If the date has not occurred, the method 200 continues to maintain the funds in the holding account. In one embodiment, a segment start date is the date on which a segment is created. The method 300 may create new segments on the 15th day of each calendar month (or soonest business day thereafter). In alternative embodiments, the method 300 may create segments less frequently in the future. As illustrated, amounts allocated to the market-backed annuity on or before the last business day prior to such date will remain in a holding account until transfer on the segment start date.

If a segment start date occurs, the method 200 calculates a performance cap and segment buffer rates, step 212. Performance cap and segment buffer rates may comprise a maximum and minimum guaranteed investment. A performance cap and segment buffer rate may be declared on the segment start date of each one-year segment and may remain in effect for the full one-year term. If at the time the current performance cap rate is declared, the interest rate currently being credited to the unloaned GIA is higher than such growth cap rate, the index-backed annuity rider will provide for an automatic transfer from the holding (where amounts allocated to the index-backed annuity are held pending transfer on the segment start date) to the unloaned GIA. After the method 200 determines the performance cap and segment buffer rates method 200 sets the performance cap and segment buffer rates and transfers the funds to the segment account, step 214.

Also, a performance cap threshold requirement may be set. A performance cap threshold is the minimum cap rate at which a client is willing to have the amounts transferred from the holding account into a segment. For example, if the performance cap threshold is set, it may remain in effect for the greater of 90 days from the date the threshold election is received or the date the amounts in the holding account are swept into a segment.

FIG. 3 presents a flow diagram illustrating a method for providing and maintaining a market-backed annuity according to one embodiment of the present invention. As the embodiment of FIG. 3 illustrates, a method 300 maintains funds in a segment account, step 302. In one embodiment, maintaining funds in a segment account comprises storing funds within a predetermined financial instrument and monitoring and managing the account with combinations of hardware and software.

The method 300 continues to maintain the funds within the segment account and checks to see whether an investor exercises an opt-out clause, step 304, or whether the segment has ended, step 308. If the investor wishes to opt-out of the segment, the method 300 exercises the opt-out option, step 306. Examples of types of opt-out provisions are full opt-out and partial opt-out. If on the segment start date immediately following the issue date of a contract, the funds in the segment type holding account are not swept into their corresponding segments, the investor has the option to cancel the contract under a special full opt-out provision. This includes situations concerning suspended or terminated segment types. There might be a time limit for the investor to enact this provision, such as the first day of the following month following the first scheduled segment start date.

A partial opt-out provision may be available for any contributions allocated to a segment type holding account where the segment type has been suspended or terminated and, as a result, the amounts in the holding account to do not sweep into the segment on the scheduled segment start date. There may be time limitations to exercise this partial opt-out provision, such as the first day of the month following the scheduled segment start date. Opt-out provisions are discussed more fully with respect to Appendices A-D. In one embodiment, the method 300 may perform a liquidity calculation if the withdrawal or transfer occurs before segment maturity. If the method 300 determines the segment is mature, the method 300 calculates the maturity value, step 310. For example, segments will mature on the 15th day of the calendar month (or soonest business day thereafter) that is approximately one year from the segment start date. In the illustrated embodiment, the maturity value corresponds to the performance of the underlying index and may be adjusted based on the performance cap rate and the segment buffer rate, as discussed previously. In one embodiment, the method 300 calculates an index performance rate that is based upon how the index or commodity performed. However, the segment rate of return will factor in the segment buffer or performance cap rate. Segment Value will reflect a fair value of the investment; can be higher or lower than the initial segment investment. If the assets are transferred or withdrawn prior to the maturity, a pro-rated cap will apply to the segment value. For example, for a 1 year segment with a cap of 15%, segment value cannot be more than 7.5% of initial segment investment after 6 months.

Prior to segment maturity, the Segment Interim Value may be based on a formula designed to estimate the fair value of the obligation to credit the Segment Interim Value on the segment maturity date. This fair value will reflect the market value of the underlying fixed instrument and options and therefore, may be impacted by interest rates and volatility levels. Longer term segments (i.e., 3-5 year segments) will be more sensitive to changes in market conditions than one-year segments. A pro rata cap may apply to the Segment Interim Value. For example, for a one-year segment with a cap of 15%, the Segment Interim Value may not be more than 7.5% of the initial investment after six months. The Segment Interim Value may be calculated as the sum of the following three elements: fair value of fixed instrument, fair value of derivatives, and expense spread refund. The fair value of fixed instrument may be calculated using the following formula: (Segment Investment)/$(1+Swap)^{(\text{time to maturity})}$. The "Segment Investment" is the amount of money invested in the segment, the "time to maturity" is the amount of time left to Segment Maturity Date, and the "Swap" is a derivative in which counterparties exchange certain benefits of one party's financial instrument for those of the other party's financial instrument. If a client withdrawals mid-segment, Market Value Calculation may determine the fair value. The Market Value Calculation is a calculation of the contract reflecting current market conditions and may lead to a positive or negative change.

Packages of options, e.g. puts and calls, are traded to hedge two-sided payout structure of a segment at maturity. Fair value is the value of the put or call options on index, e.g. without reinvested dividends, having a notional value on the segment start date equal to investment in the segment, based on Black-Scholes option formula, using the current swap rates, and current value, dividend rate, and implied volatility of the index as input parameters, and strike prices as of the current date. The strike price at segment maturity is equal to either the segment investment (for the at-the-money call), or the segment investment multiplied by (1+growth cap rate) (for the out-of-the-money call) or the segment investment multiplied by (1−segment buffer)(for the put). The fair value of the derivatives is then adjusted for one-half bid-ask spread for index.

The expense spread refund reallocates to the Segment Interim Value the unamortized portion of any expense spread. The Segment Interim Value is then limited to a pro-rate portion of the segment cap. For example, if the one-year Segment cap is 10%, the mid-year Segment Interim Value is limited to 105% of investment.

The method 300 then determines if an investor wishes to withdraw or surrender the account, step 312. If the method 300 determines a withdrawal or surrender, the method 300 processes the withdrawal or surrender in accordance with contracted withdrawal or surrender terms, step 314 (see e.g., Appendices A-D). In some embodiments, withdrawals may be permitted at any time. There may be different withdrawal methods including lump sum and automatic required minimum distribution (RMD). Lump sum withdrawals are withdrawals where the owner may choose to take withdrawals as needed on an ad hoc basis. The minimum amount for a lump sum withdrawal is $300. The owner may provide instructions for specific variable investment options and/or segment type holding accounts from which to withdraw funds. A specific dollar amount or percentage must be stated for each account requested. If there is no money in the holding accounts, the client can request to take a specific dollar amount or percentage out of segments. If no instructions are provided, the entire withdrawal amount may be taken from the accounts on a pro rata basis. If there is insufficient value in the holding accounts, the balance of the withdrawal may be taken from the segments on a pro rata basis.

In some embodiments, the automatic RMD withdrawal service is available for owners age 70 and ½ years or older for IRA. The entire amount may be withdrawn from the variable investment options first on a pro rata basis, then from the segment type holding accounts on a pro rata basis if there is insufficient account value in the variable investment options. If there is insufficient account value in the holding accounts, the balance of the withdrawal will then be taken from segments on a pro rata basis.

A full surrender may be permitted at any time. The surrender value may be the account value less any contingent withdrawal charges. Also, an owner might want to transfer funds to or from the account. Transfers may be permitted except to or from segments before maturity.

If the method 300 determines the investor does not wish to surrender or withdraw funds, the method 300 transfers the funds into a holding account, step 316, as previously discussed. In one embodiment, there is a five year contingent withdrawal charge and the surrender value is calculated based on Account Value minus contingent withdrawal charge. There is a free corridor of 10% of account value at previous contract anniversary.

FIG. 4 presents a flow diagram illustrating a method for ending a market-backed annuity, and providing and managing a rollover option according to one embodiment of the present invention. As the embodiment of FIG. 4 illustrates, the method 400 transfers non-surrendered or non-withdrawn funds into a holding account, step 402, as previously discussed. The method 400 then determines if an investor wishes to rollover the annuity, step 404. In the illustrated embodiment, the method 400 determines whether an annuity should be rolled over based on the investor's annuity contract (see e.g., Appendices A-D).

If the method 400 determines that an annuity should not be rolled over, the method 400 distributes funds in accordance with the investor's contract, step 406 (see e.g., Appendices A-D). If the method 400 determines that the annuity should be rolled over, the method 400 transfers the funds into a new segment term and operates similar in respect to the methods described in FIGS. 2-3. In one embodiment, the method 400 may rollover the annuity into a segment term identical to the recently ended term. In an alternative embodiment, method 400 may rollover the annuity into a different segment term according to the investor's instruction.

In the illustrated embodiment, the segment maturity value can be transferred from the index-backed annuity to the unloaned GIA or the variable investment options at segment maturity at the policy owner's direction. In one embodiment, if the policy owner does not instruct otherwise, the segment maturity value less any amount transferred to the GIA to cover the next 12 monthly deductions will be rolled over automatically into a new segment on the new Segment Start Date (FIG. 3).

Figure 5A:
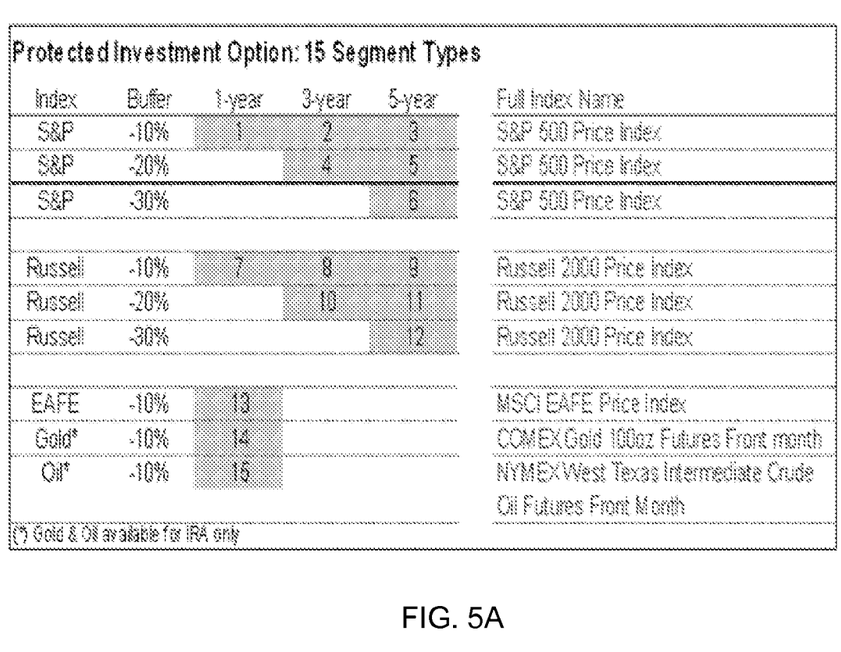
FIG. 5a is chart illustrating available indices and segment durations according to one embodiment of the present invention.

FIG. 5a is chart illustrating the available indices and segment durations. As the embodiment of FIG. 5a illustrates an investor may select a given index to back the investment-back annuity. In addition to selecting an index, the investor may further select a given segment buffer rate (e.g., −10%, −20%, −30%). Finally, the investor may further select a given segment term (e.g., 1, 3, or 5 years). As indicated in FIG. 5a, by customizing the above described options, an investor may increase the flexibility of the annuity and select from fifteen unique annuity plans.

Figure 5B:
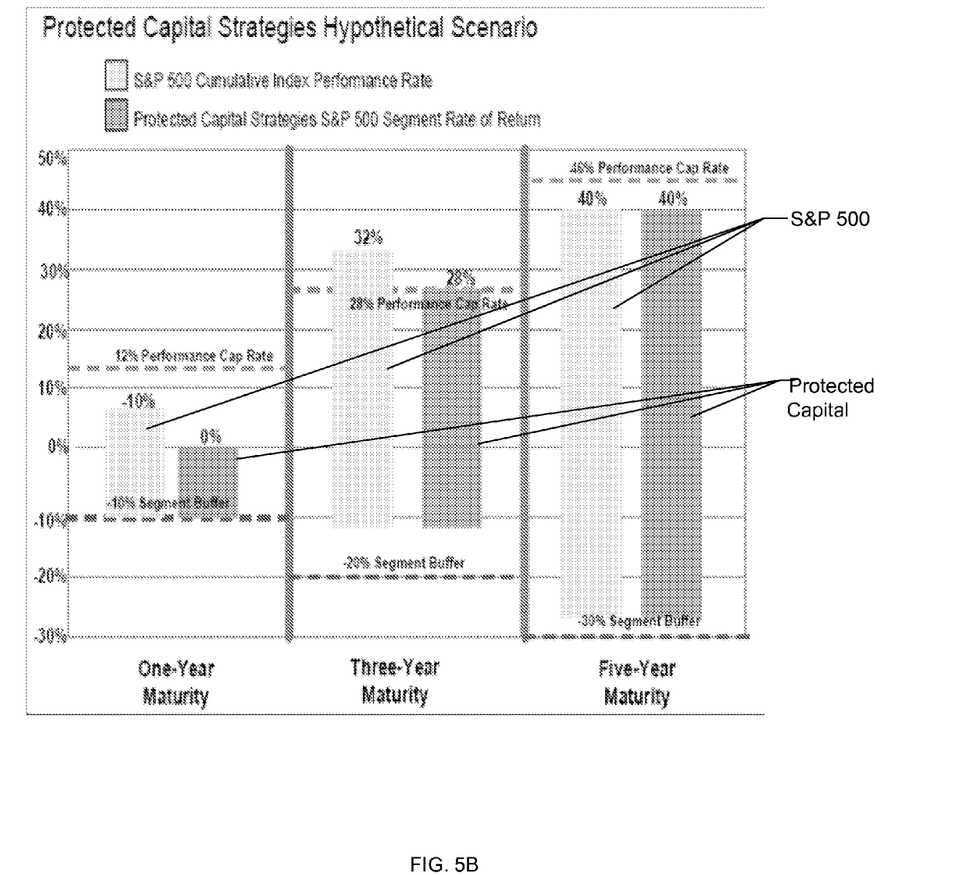
FIG. 5b is a chart showing three independent segments invested in 1, 3 and 5 year segments with −10%, −20%, and −30% segment buffers respectively according to one embodiment of the present invention.

FIG. 5b is a chart showing three independent segments invested in 1, 3 and 5 year segments with −10%, −20%, and −30% segment buffers respectively. The chosen portfolio is tracking the S&P500 and its range of volatility until reaching the Segment Rate of Return at Segment Maturity. The first illustration shows how the investor can eliminate as much as 100% of loss, while the following two illustrations show how the investor can capture 88% to 100% of your gains.

Figure 5C:
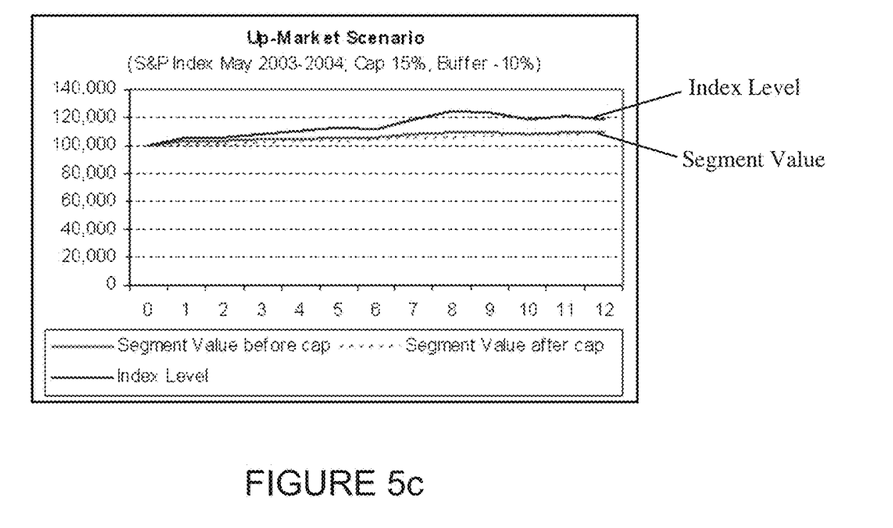
FIGS. 5c-d are charts illustrating a segment value before maturity according to one embodiment of the present invention.
Figure 5D:
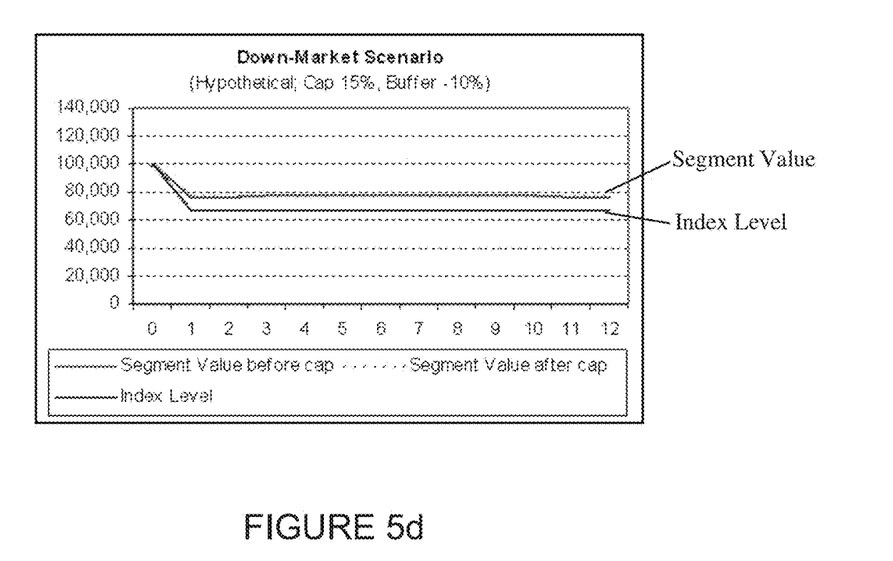

FIGS. 5c-d present charts illustrating a segment value before maturity. As illustrated, an investor may invest a fixed amount ($100,000). In an up-market scenario, the underlying asset (the S&P 500) increases between year 1 and year 12. Accordingly, the segment value before cap increases, but is limited after cap based on the 15% performance cap rate. Conversely, in a down-market scenario, the underlying asset decreases between years 1 and 12. However, despite the down-market conditions, the investor's amount after cap is limited based on the −10% segment buffer.

Figure 6:
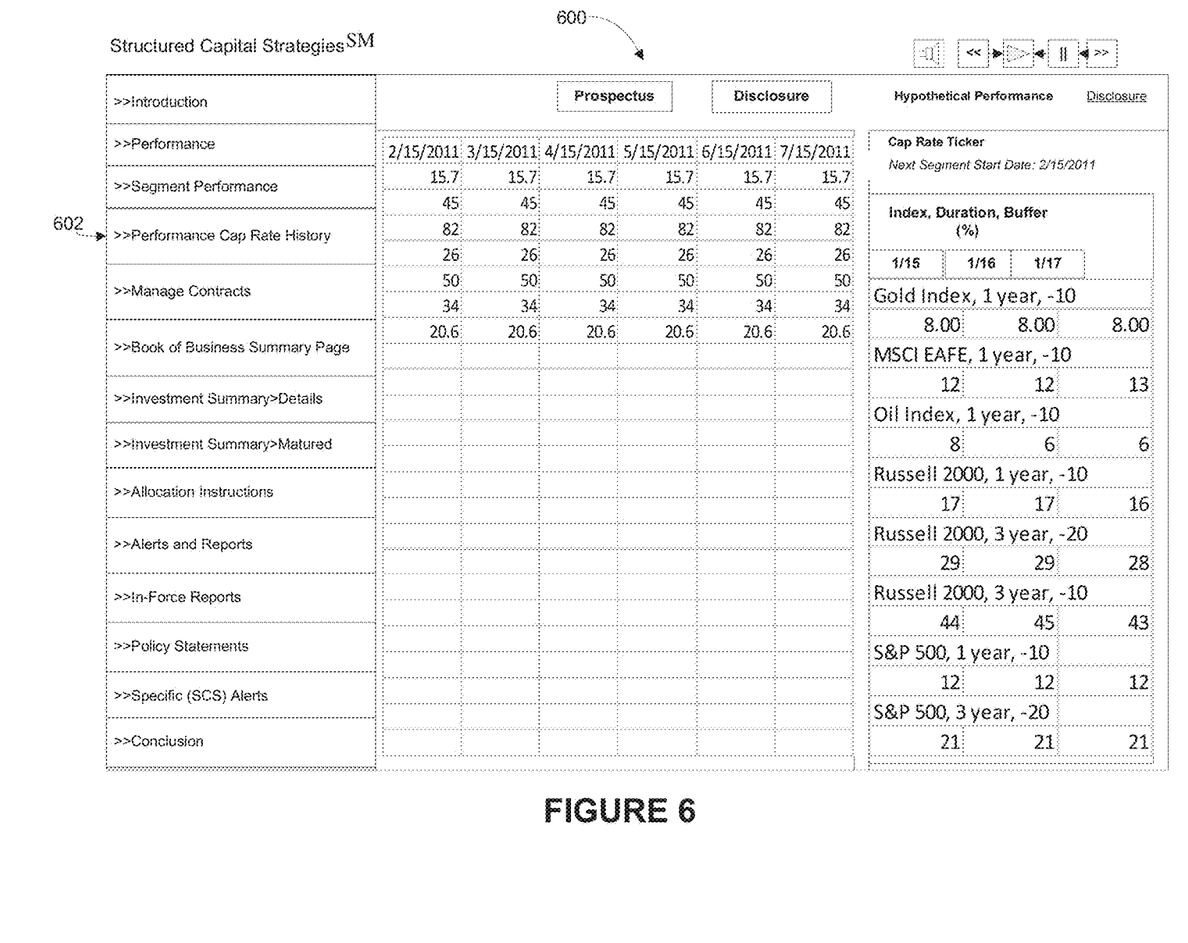
FIG. 6 is a screen shot illustrating the Performance Cap Rate Ticker.

FIG. 6 is an example screen shot of the performance cap rate ticker (600). The performance cap rate ticker eliminates the need to determine the structured investment option performance cap prior to segment start date. The investors and advisors can monitor the daily performance cap online with historical indicative caps for the previous five days. The actual declared and historical monthly performance cap rates (602) are also displayed on the website for historical analysis. With this feature, advisors and clients can monitor and determine if they would like to set a performance cap threshold.

Figure 7:
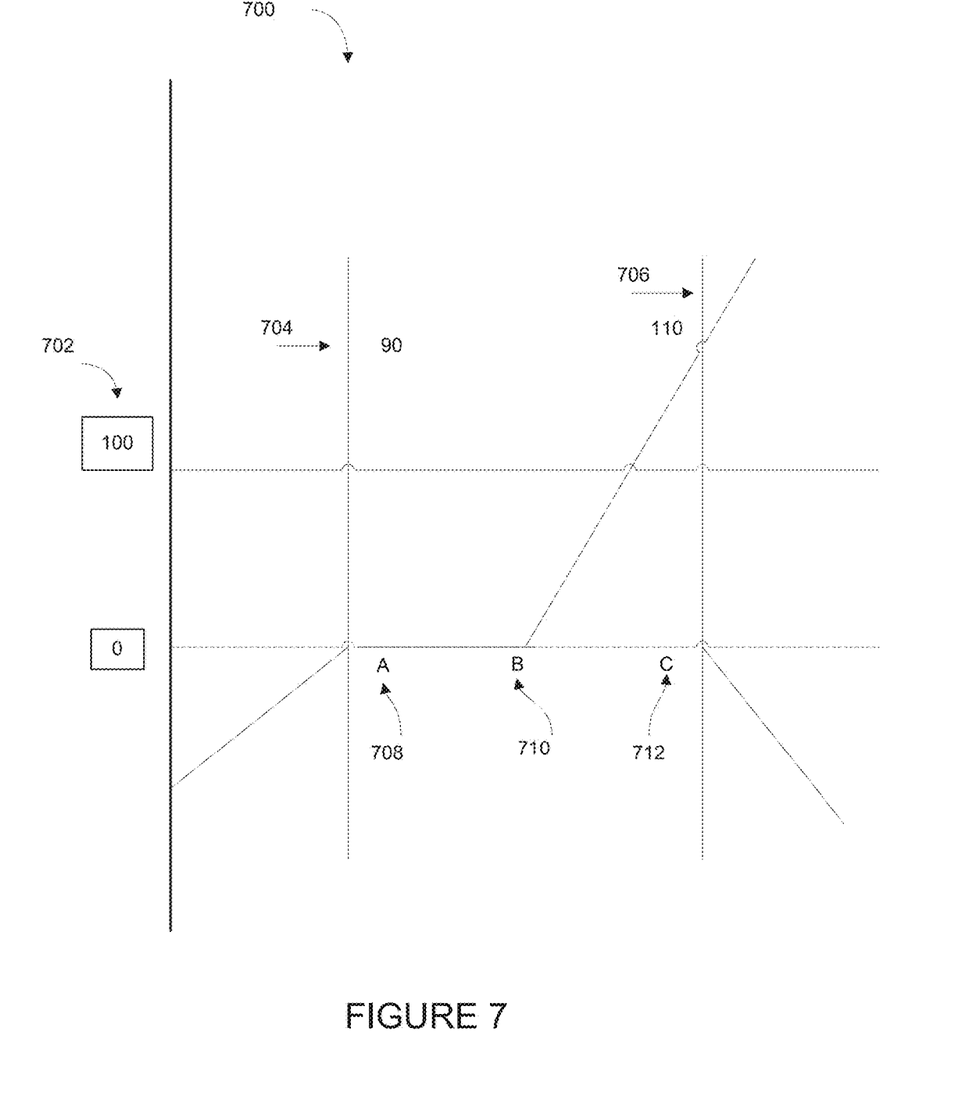
FIG. 7 is illustration of an example of a call spread collar options strategy

FIG. 7 is an illustration of an example of a call spread collar options strategy (700). An option is a contract that gives the buyer the right, but not the obligation, to buy or sell an underlying asset at a specified price on or before a certain date. The specified prices are called the strike prices. A call is an option contract giving the owner the right (but no obligation) to buy a specified amount of an underlying investment at a specified price within a specific time. A put is an option contract giving the owner the right (but no obligation) to sell a specific amount of an underlying investment at a specified price within a specific time.

Buying a call option allows investors to benefit from upside movement of the index above the strike price. There is no downside exposure below the strike prices. The investor may incur a cost for this option. Buying a put option allows investors to benefit from downside movement of the index below the strike price. There is no downside exposure for the investor if the index exceeds the strike price. The investor may incur a cost for this option. Selling a call option means that the investor will lose money if the index increases above the strike prices. There is no upside for the investor and so the investor may receive a premium for the option. Selling a put option means that the investor will lose money if the index falls below the strike prices. There is no upside for the investor and so the investor may receive a premium for the option.

A call spread collar is a common options strategy that provides a cost effective way to provide upside performance and reduce downside losses. It is created by buying and selling a combination of call and put options, and also investing in a fixed income instrument. Upside performance is from buying a call option at-the-money, i.e. strike price=index price. Performance cap is from selling a call option out-of-the-money, i.e. strike price=performance cap. Negative performance below buffer is from selling a put option out-of-the-money, i.e. strike price=buffer. Interest income is earned from buying a fixed income instrument. A fixed income instrument is a bond or a swap that is purchased that backs the initial segment account.

For example, one-year call spread collar based on $100 initial investment (702), with 10% buffer and 12% performance cap is constructed to provide $2.00 or 2% of revenue to finance commission, expenses and profit margin. First, an investment in one-year fixed income instrument with 0.50% interest rate which equals $0.50 revenue may be made. Expected revenue from call spread collar is $1.50. The call spread collar includes a sell out-of-the-money put at $90 (704), i.e. the buffer, which equals $5.50 revenue, a buy at-the-money call at $100 (for upside) which has a $8.00 cost, and a sell out-of-the-money call at $112 (706), i.e. the growth cap, which has a $4.00 revenue. Adding the costs and the revenue makes the call spread collar $1.50.

An out-of-the-money put is sold to replicate the downside movement if the index declines by more than the buffer (708). An at-the-money call is purchased to replicate the return if the index increases (710). An out-of-the-money call is sold to limit upward movement of the underlying index (712).

In some embodiments, there may be maximum age restrictions. For example, the maximum issue age may be 85, and the maximum contribution age may be set for the life of the contract at a data equal to age 86 or the first contract anniversary whichever is later. Contributions are based on the age of the older of the original owner(s) and annuitant(s). Maturity is based on the age of the annuitant and the maximum maturity age may be set to the contract anniversary following the attainment of age 95 when the contract is issued. The date may not change for the life of the contract. The contract may automatically be annuitized within 30 days following the maximum maturity date if the client does not respond to notices sent prior to that date.

There may also be a beneficiary continuation option (BCO). The investor may choose a single beneficiary or multiple beneficiaries. With a single beneficiary, if any part of the annuity account still invested in segments that have not yet matured, the beneficiary may have to wait until the segment matures before making alternate investment elections for the money in those segments. For multiple beneficiaries, claims without the BCO election will have partial withdrawals from segments. When the first claim with the BCO is processed, all active segments may be terminated and default to a money market variable investment option. For both the single beneficiary and the multiple beneficiaries, if a five-year BCO payout is elected, the beneficiary may not have the option to elect a segment type with a duration that is longer than the remaining period during the five-year rule and amounts may not be swept into segments if the segment maturity date will be later than the remaining period of the five-year rule. In other embodiment, a stretch-out BCO payment may be elected. A stretch-out BCO payment is the annual Required Minimum Distribution payment calculated for the BCO and automatically distributed annually. Also, if stretch-out BCO payments are elected, the beneficiary may not have the option to elect a segment type with a duration that is longer than the remaining life expectancy and amounts may not be swept into segments if the segment maturity date will be later than the remaining life expectancy.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method utilizing a processing device for providing an index-backed annuity, the method comprising:
   electronically receiving an investor request for an index-backed annuity and a plurality of funds to be invested in the index-backed annuity;
   electronically receiving a selection of at least one investment segment, for each investment segment receiving a selection of a segment term;
   electronically placing, via a processing device, the plurality of funds in a holding account;
   electronically determining, via the processing device a performance cap rate and a segment buffer rate and transferring the plurality of funds to a segment account on a segment start date;
   receiving a request to exercise an opt-out option prior to maturity of the segment term;
   electronically calculating, via the processing device, a segment interim value of the index-backed annuity prior to the maturity of the segment term, the segment interim value calculated based at least on a of a current value of fixed instruments, current value of derivatives, and an expense spread refund based on the current value of the derivatives and a value of the derivatives at the segment start date;
   crediting the segment interim value of the index-backed annuity to the plurality of funds in the segment account;
   in response to a rollover request, electronically determining whether the index-backed annuity should be rolled over based on an annuity contract of the investor; and
   upon determining that the index-backed annuity should be rolled over, electronically transferring the plurality of funds into a new investment segment.

2. The method of claim 1, wherein the maturity value corresponds to the performance of the underlying index of the index-backed annuity and may be adjusted based on the performance cap rate and the segment buffer rate.

3. The method of claim 1, the method further comprising calculating an index performance rate based on performance of the underlying index of the index-backed annuity.

4. The method of claim 1, the investor request further comprises a selection of an index to back the index-backed annuity.

5. The method of claim 1, wherein the performance cap rate is the maximum guaranteed investment return.

6. The method of claim 1, wherein the segment buffer rate is the guaranteed investment loss protection.

7. The method of claim 1, the method further comprises upon determining that the index-backed annuity should not be rolled over, distributing the index-backed annuity based on the investor's contract.

8. The method of claim 1, wherein the segment term is 1, 3, or 5 years.

9. The method of claim 1, the method further comprises selecting an opt-out threshold.

10. The method of claim 1, wherein the at least one investment segment is associated with a given indexed fund.

11. The method of claim 1, the method further comprises purchasing one or more financial instruments using the plurality of funds transferred to the segment account.

12. The method of claim 1, the method further comprises calculating a maturity value of the at least one investment segment upon determining that the segment term has matured.

13. The method of claim 12, wherein the maturity value corresponds to the performance of the underlying index of the index-backed annuity.

14. The method of claim 12, the method further comprises adjusting the maturity value based on the performance cap rate and the segment buffer rate.

15. The method of claim 1 wherein the value of financial instruments includes current market values of one or more underlying fixed instruments.

16. The method of claim 1 wherein the current value of derivatives includes current market values of one or more underlying options.

17. The method of claim 1 wherein receiving a selection of at least one investment segment includes receiving a plurality of investment segments, the plurality of investment segments including a variety of durations.

18. The method of claim 1 wherein calculating the segment interim value includes applying a pro rata cap.

19. The method of claim 18 wherein the pro rata cap is based on an elapsed time after the segment start date.

20. A computerized method utilizing a processing device for providing an index-backed annuity, the method comprising:
   electronically receiving an investor request for an index-backed annuity and a plurality of funds to be invested in the index-backed annuity;
   electronically receiving a selection of at least one investment segment, for each investment segment receiving a selection of a segment term;
   electronically placing, via a processing device, the plurality of funds in a holding account;
   electronically determining, via the processing device a performance cap rate and a segment buffer rate and transferring the plurality of funds to a segment account on a segment start date;
   receiving a request to electronically calculate, via the processing device, a segment interim value of the index-backed annuity prior to the maturity of the segment term, the segment interim value calculated based at least on a current value of financial instruments, a current value of derivatives, and an expense spread refund based on the current value of the derivatives and value of the derivatives at the segment start date;

crediting the segment interim value of the index-backed annuity to the plurality of funds in the segment account; and in response to a rollover request, electronically transferring the plurality of funds into a new investment segment.

\* \* \* \* \*